Feb. 16, 1943. R. B. SHUGART ET AL 2,311,480
MOLDING MACHINE
Filed Sept. 5, 1941 6 Sheets-Sheet 3
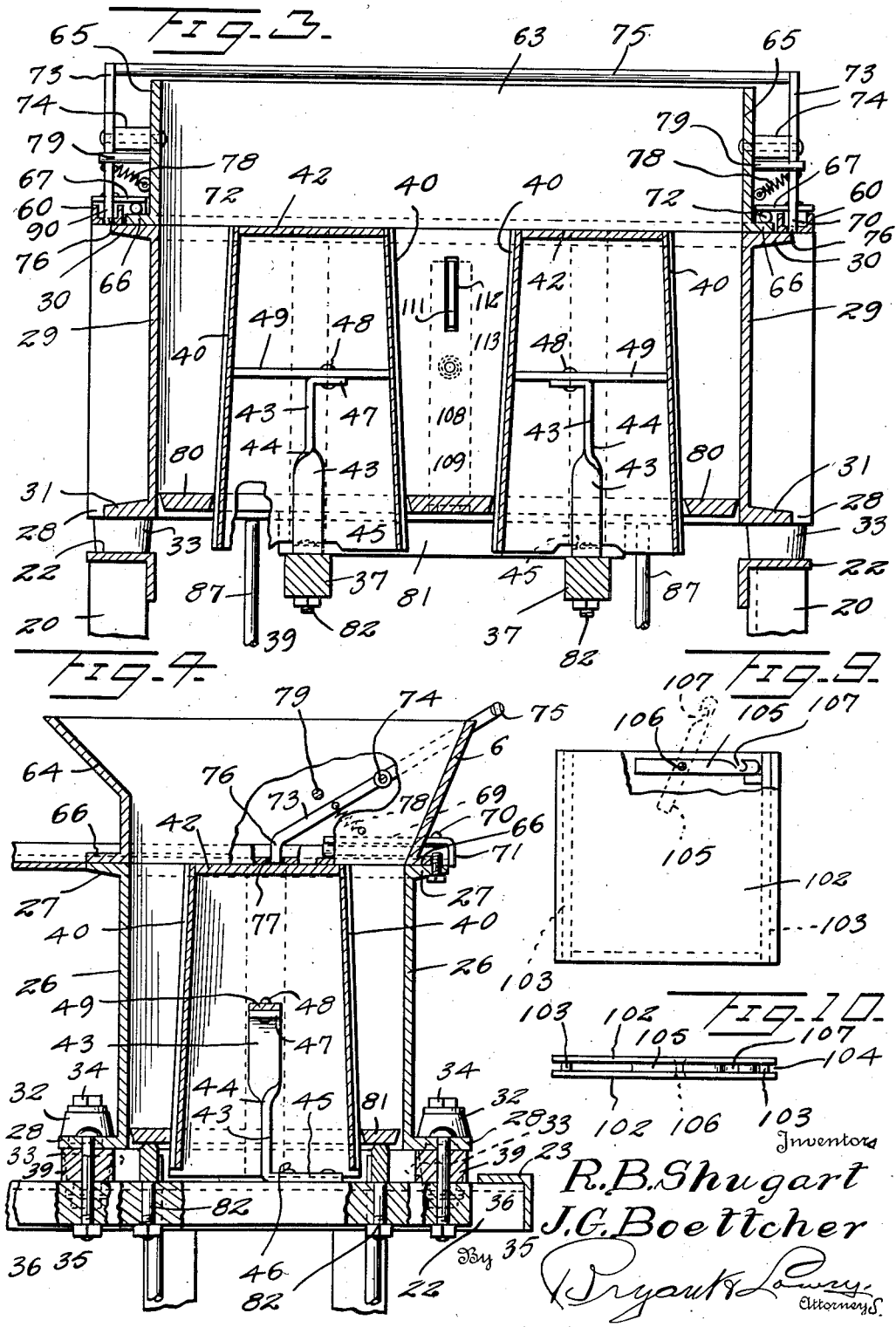

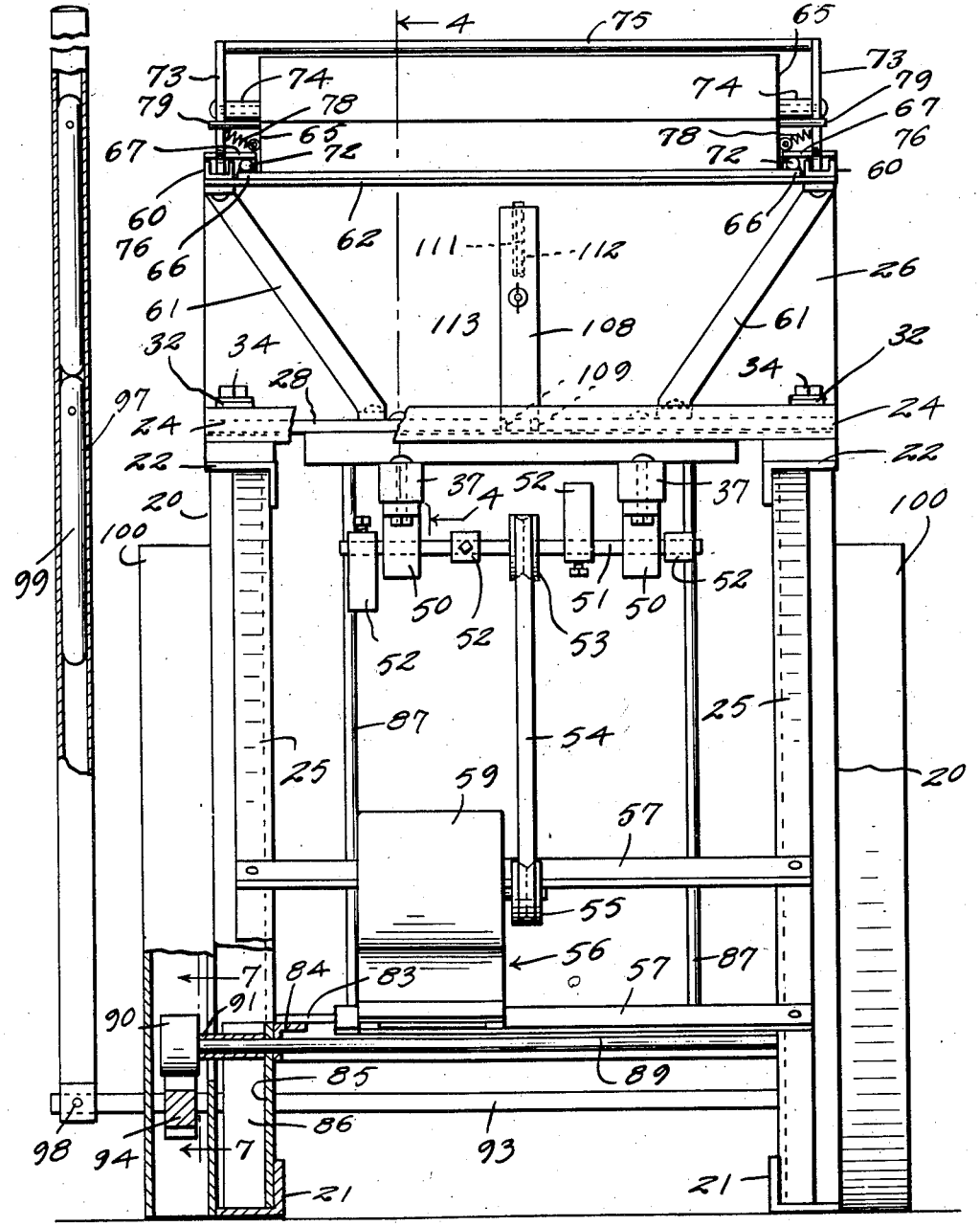

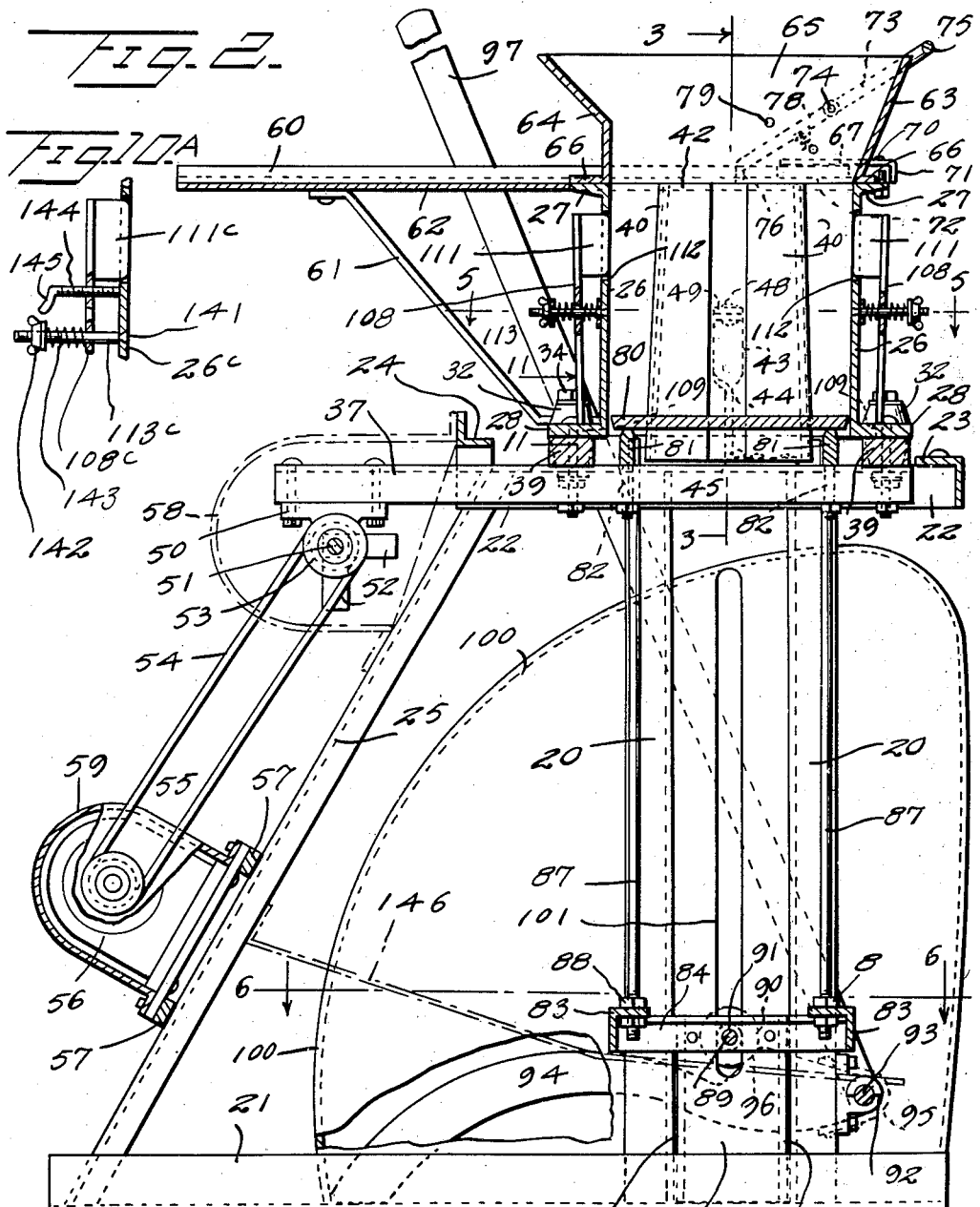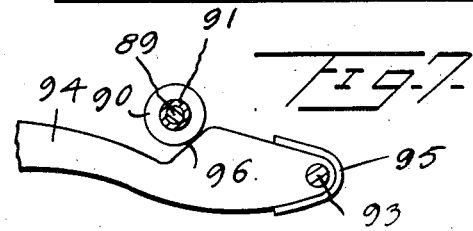

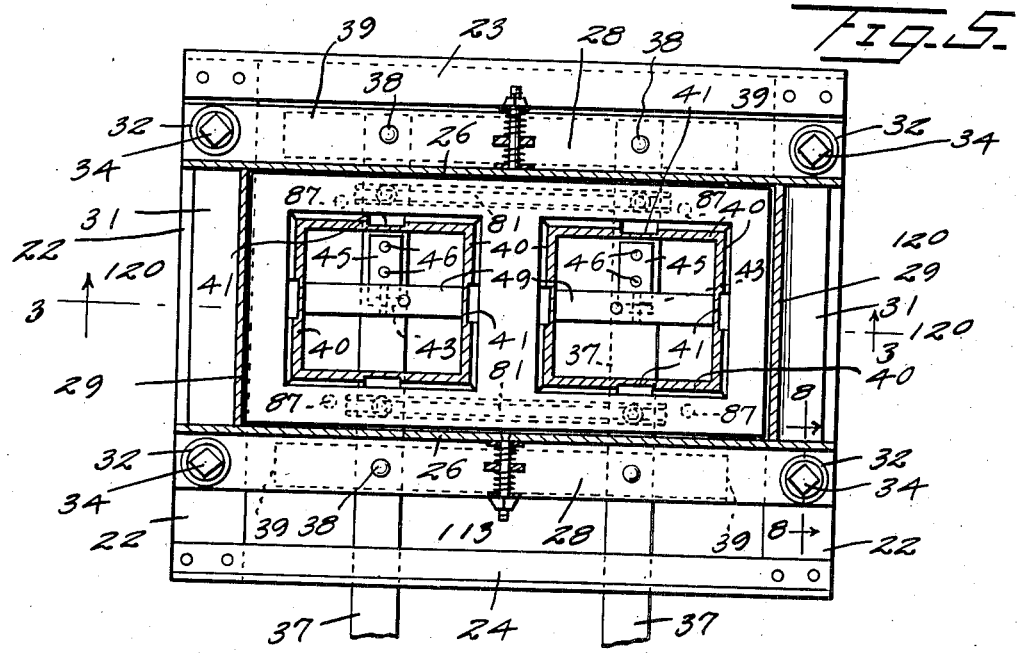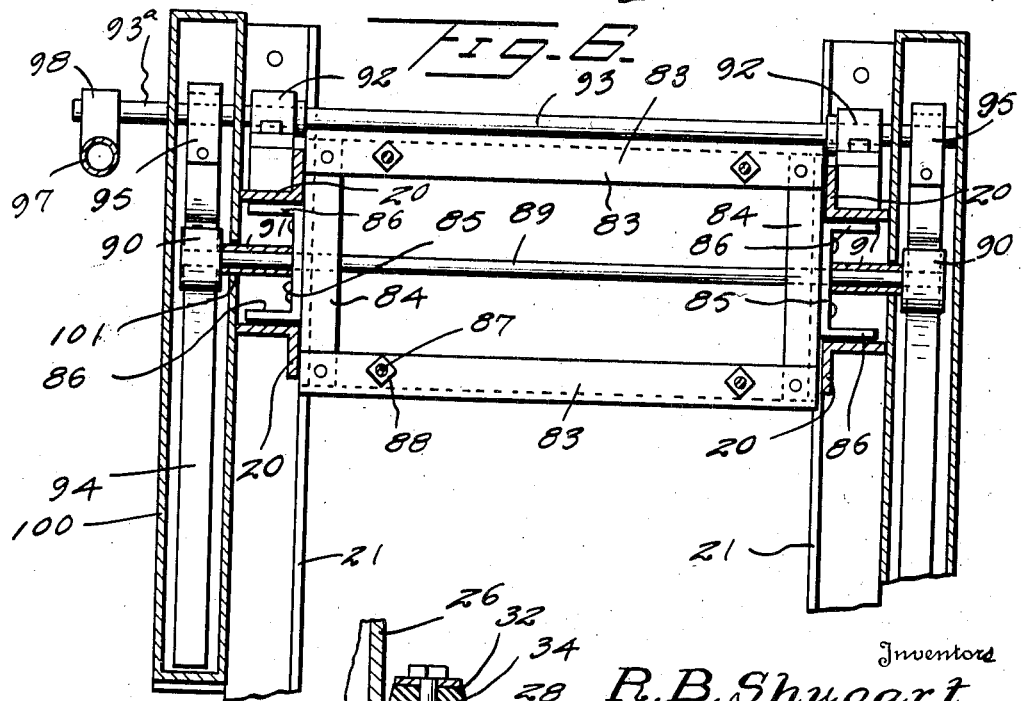

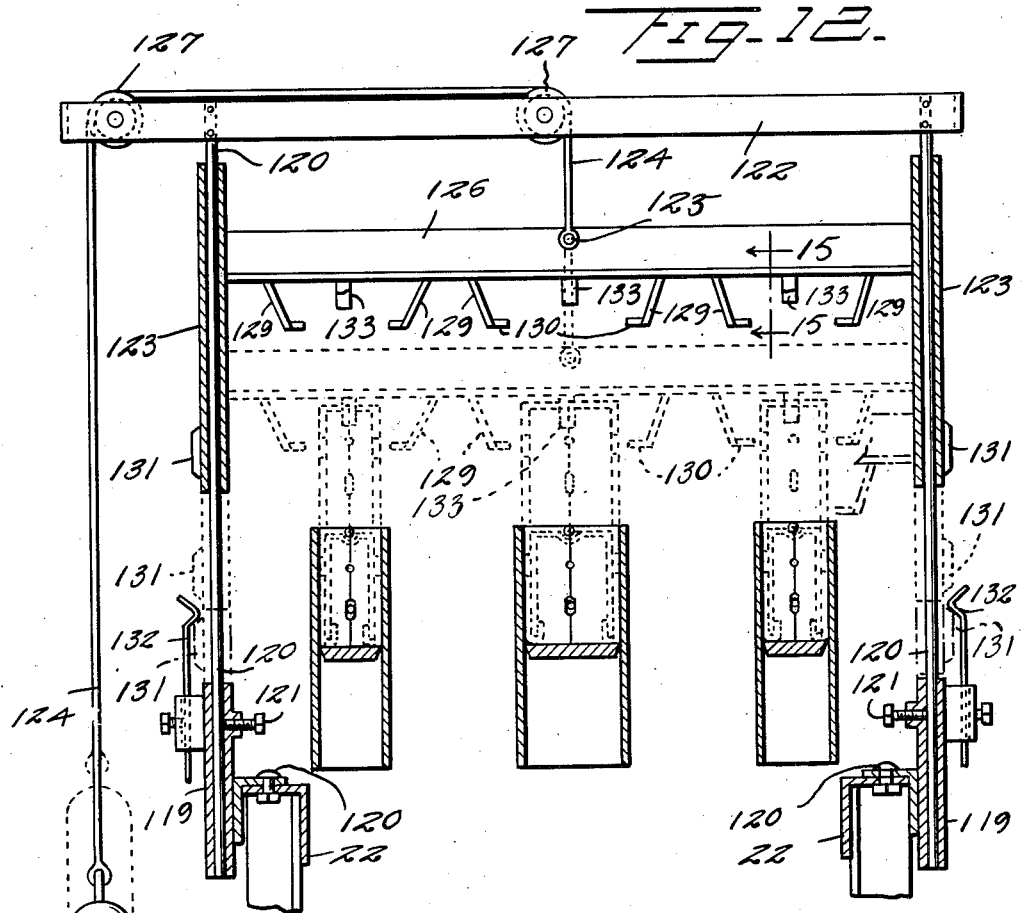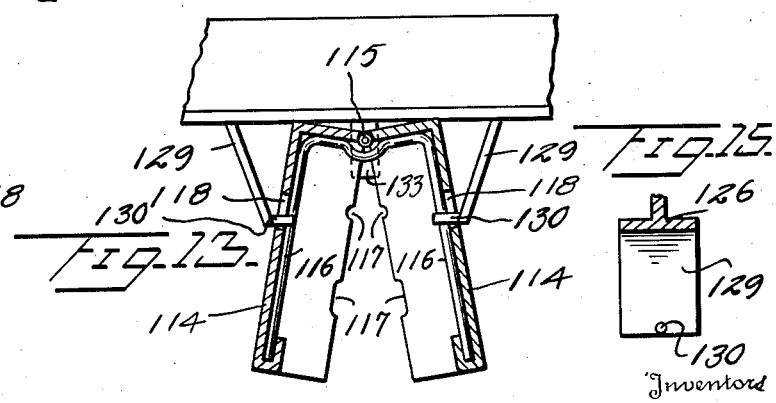

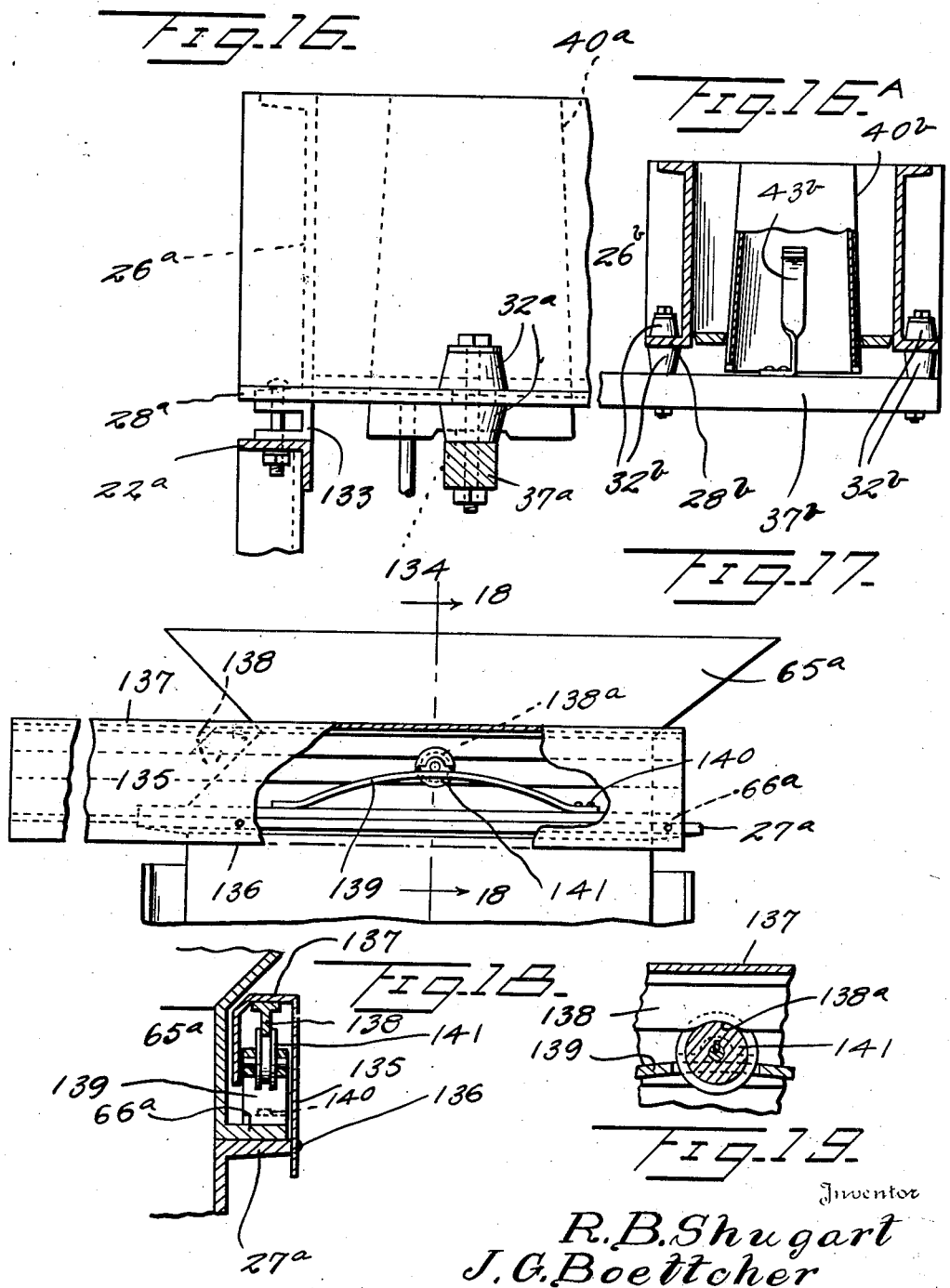

Patented Feb. 16, 1943

2,311,480

UNITED STATES PATENT OFFICE 2,311,480

MOLDING MACHINE

Robert B. Shugart and Justice G. Boettcher, Orlando, Fla.

Application September 5, 1941, Serial No. 409,728

12 Claims. (Cl. 25—41)

This invention relates to certain new and useful improvements in molding machines.

The molding machine disclosed herein is designed for the molding of blocks of any desired material, such as concrete, cinders, asphalt, marble shipping, slag, shell, sawdust compositions and the like, and in known machines of this general character, it has heretofore been the practice to construct them with a vibrating mold box or core in an endeavor to obtain settling and compacting of the block material in the mold. However, in such known constructions and particularly where attempts have been made to vibrate the cores to accomplish settling of the material, the vibrating mechanism has been so associated with the cores as to produce an uneven vibration thereof, or in other words, the upper end or head of the core will vibrate at more pronounced amplitudes than the lower or base end of the core, or vice versa, which results in the molding of a block of uneven texture.

It is therefore one of the principal objects of the present invention to provide a molding machine for blocks or the like wherein the machine includes a mold box with vibrating cores therein and with vibrating devices associated with the cores in a manner to cause even vibrations thereof or vibrations of like amplitudes at the top and bottom ends of the cores.

It is a further object of the invention to provide a block molding machine of the foregoing character wherein the mountings for the mold box and cores are operative for producing vibratory movements thereof to accomplish a more perfect settling and compacting of the block material in the mold box.

In block molding machines of the character disclosed herein, the block material substantially freezes or adheres to the walls of the mold box and cores during compacting of the block material in the presence of vibrating activities, and it is a further object of the invention to provide a novel construction of block ejecting mechanism wherein the usual elongated lever for the operation of the ejecting mechanism has devices associted therewith operative for multiplying the leverage of the ejecting lever to effect an easier separation of the block from the mold box and core with a minimum of effort.

A still further object of the invention is to provide an improved type of core for a block molding machine advantageous for use in the molding of double-walled or ready furred blocks and wherein the side walls of the core are provided longitudinally of the core with grooves for different types of spacer elements for the separation of webs of blocks constituting position locating means for the spacer element.

A still further object of the invention is to provide a molding machine especially designed for blocks of the double-walled or ready furred type and is so constructed whereby a partition element may be removably inserted therein for the molding of two complete half blocks.

It is a still further object of the invention to provide a block molding machine for double-walled or ready furred blocks with spacer elements for the block webs removably mounted in the box with devices for automatically gripping the spacer elements and extracting them from the molded blocks during ejection of the latter from the molding machine, the spacer element gripping devices moving the spacer elements to an elevated position relative to the ejected blocks and holding them suspended until manually removed.

With the above and other objects in view that will become apparent as the nature of the invention is better understood, the same consists in the novel form, combination and arrangement of parts hereinafter more fully described, shown in the accompanying drawings and claimed.

In the drawings:

Figure 1 is a rear elevational view, partly broken away and shown in section of a block molding machine constructed in accordance with the present invention, illustrating the unbalanced shaft;

Figure 2 is a vertical longitudinal sectional view showing the unbalanced shaft in a remote position or materially removed from the zone of the mold box and cores and so associated with the latter as to increase vibratory frequencies thereof and the block ejecting mechanism to effect an easy release of the block from the mold box;

Figure 3 is an enlarged detail sectional view taken on line 3—3 of Figure 2, showing the vibrating twisted spring arm connections between parts of the vibrating mechanism and the cores;

Figure 4 is a vertical detail sectional view taken on line 4—4 of Figure 1, showing one construction of latch device for restraining the shiftable hopper from movement when in position over the mold box;

Figure 5 is a horizontal sectional view taken on line 5—5 of Figure 2, of the mold box as supported on the rigid head of the base frame and the vibrating bars supporting the cores and also the grooves extending longitudinally of the outer faces of the cores for receiving and locating spacer elements employed in the manufacture of double-walled or ready furred blocks;

Figure 6 is a horizontal sectional view taken on line 6—6 of Figure 2, showing the lower portion of the ejecting mechanism and the operating means therefor;

Figure 7 is a fragmentary elevational view, partly in section of one of the cam arms and associated roller of the ejecting mechanism;

Figure 8 is a detail sectional view taken on line 8—8 of Figure 5, showing the cushioned or rubber block mounting for the mold box on the head of the machine frame;

Figure 9 is a side elevational view, partly broken away, of the partition member removably mounted in the mold box when molding half blocks, the latch arm to facilitate removal thereof being illustrated in a dotted line position;

Figure 10 is a top edge view of the removal partition shown in Figure 9, showing the spaced wall structure thereof to provide side grooves that cooperate with tongues on the mold box;

Figure 10A is a detail view, partly in section of another construction of operating device for projecting the guide fingers for the removable partition into the mold box;

Figure 11 is a detail sectional view taken on line 11—11 of Figure 2, showing the freely movable forked support for the lower end of the arm carrying the guide tongue projectile into the mold box and with which the removable partition is associated;

Figure 12 is a fragmentary elevational view, partly in section of the receiver mechanism for the spacer elements used in the molding of a double-walled or ready furred block, the receiver mechanism for the spacer elements being illustrated by dotted lines in several operative positions;

Figure 13 is a fragmentary elevational view of the receiver mechanism with one of the spacer elements shown in section and illustrated in an expanded position and supported by said receiver mechanism;

Figure 14 is a bottom plan view of the spacer elements shown in Figure 13 and illustrating tapered side walls thereof to facilitate removal of the blocks;

Figure 15 is a detail sectional view taken on line 15—15 of Figure 12;

Figure 16 is a fragmentary elevational view, partly in section, showing a rigid mounting for the mold box on the machine frame and a cushion block connection between the vibrating arms of the vibrating mechanism and the core;

Figure 16A is a fragmentary sectional view of another form of mounting for the mold box and cores;

Figure 17 is a fragmentary side elevational view, partly in section of another form of mounting for the hopper for holding same down to prevent creeping movement thereof;

Figure 18 is a detail sectional view taken on line 18—18 of Figure 17; and

Figure 19 is a fragmentary longitudinal sectional view showing the spring carried roller engaged in the notch of the track or rail, illustrated in Figure 17.

The block molding machine may be constructed of any materials desired and for purposes of illustration, the main frame structure is shown as being of angle iron construction, the frame structure comprising vertical standards 20, preferably four in number that are welded or otherwise secured at their lower ends to a pair of parallel elongated feet 21, the standards 20 providing a rectangular frame with two of such standards secured to a foot. Horizontal head rails 22 are riveted, welded or otherwise secured to the upper ends of the standards 20, the head rails being parallel with the respective feet at opposite sides of the frame structure, the front ends of the head rails being connected together by cross bars 23, while the rear ends thereof are connected together by cross bars 24, as clearly shown in Figures 2 and 5. Inclined brace bars 25 extend between the rear ends of the head rails 22 and the rear extended ends of the feet 21 of the frame structure, as shown in Figure 2.

The mold box is mounted upon the head rails 22 and being of rectangular formation in its preferred form, comprises perpendicular side walls 26 carrying top and bottom flanges 27 and 28 respectively and end walls 29 carrying top and bottom flanges 30 and 31 respectively, these walls being secured together in any preferred manner, as by welding or the like. The particular connection or mounting of the mold box upon the head rails 22 is shown more clearly in Figures 5 and 8 as being mounted at the corners of the mold box and comprising a pair of rubber blocks 32 and 33 respectively arranged above and below the base flange 28 of the side walls 26 of the mold box with the opposed ends of the rubber blocks extended through an enlarged opening in said flange for contact with each other as shown in Figure 8, the rubber blocks and the side wall flange 28 and the head rail 22 while a tie bolt 34, headed at its upper end and passing downwardly through the cushion blocks 32 and 33 as well as the head rail 22 receives upon its lower end a retaining nut 35 with a rubber gasket 36 interposed between the nut and the lower face of the head rail 22 to provide the maximum of resilient mounting for the mold box as well as quietness in operation.

The mold box disclosed herein with its core and spacer element appurtenances is designed for molding a solid web-type block or a ready furred block of double-wall formation, a pair of cores being arranged in the box and having supporting and vibrating means therefor comprising, as shown more clearly in Figures 3 and 5, a pair of spaced parallel bars 37 having their front ends underlying the mold box and rigidly connected to the base flanges 28 of the side walls of the moldbox by means of the tie bolts 38 with a filler bar 39 interposed between said bars 37 and the base flanges 28. A core is resiliently supported upon each bar 37 to rise therefrom, such resilient mounting to be presently described. Each core is of general frusto-pyramidal formation and has tapering side walls 40, the outer faces of which are longitudinally grooved as at 41 throughout their length intermediate the side edges thereof for the guiding reception of spacer elements to be later described. The core is of hollow construction, being open at its lower end and closed at its upper end by a top wall 42. The resilient connection between the core and its supporting bar 37 comprises a leaf or strap spring 43 twisted intermediate its ends as at 44, the lower end of the leaf spring 43 being bent at right angles as at 45 and secured as at 46 to the bar 37. The upper end of the twisted spring 43 is bent at right angles as at 47 and is riveted, welded or otherwise secured as at 48 to a cross arm 49 that is welded or otherwise secured to opposite walls 40 of the core substantially midway between the upper and lower ends thereof.

Means is provided for vibrating the bars 37 which in turn effect vibratory activities of the mold box and cores and as shown more clearly in Figures 1 and 2, the rear ends of the vibrating bars 37 extend a considerable distance rearwardly of the mold box, each carries on its underside at said rear end a depending bearing 50 for the journalling of an unbalanced shaft 51, the shaft 51 carrying a plurality of radially extending counter-balancing elements 52 that respectively extend in different radial directions from the longitudinal axis of the shaft 51 to effect vibratory movements of the shaft during rotation thereof. To effect rotation of the shaft 51, the same has a pulley wheel or sheave 53 midway the ends thereof, the sheave 53 having a belt connection 54 with a sheave 55 carried by the shaft of the motor 56 that is supported upon the frame bars 57, secured at their ends in any preferred manner to the inclined brace bars 25 as illustrated in Figures 1 and 2. A guard or hood 58 encloses the rear ends of the vibrating bars 37 and the vibrating mechanism associated therewith, while a like protecting hood 59 encloses the motor 56.

A table structure and material feed hopper for the mold are associated with the upper end of the mold box and as shown more clearly in Figures 1 to 4, a pair of upwardly opening channel bars 60 are supported upon the top flanges 38 of the end walls 29 of the mold box and extend a considerable distance rearwardly of the mold box, as shown in Figure 2, with their extended ends supported by diagonal braces 61 disposed between the extended ends of the channel bars and the base flanges 28 of the adjacent side wall of the mold box. A table 62 is carried by the channel bars 60 rearwardly of the mold box, as shown in Figure 2. The material feed hopper of conventional shape comprises front and rear walls 63 and 64 respectively and end walls 65, the lower ends of said walls carrying outwardly directed flanges 66 resting upon the flanges carried by the upper ends of the walls of the mold box when the hopper is in a position overlying the mold box. The hopper is readily displaceable relative to the table structure and mold box of the machine and to guide the hopper into its correct position overlying the mold box and to prevent upward movement of the hopper when in its mold box seating position, a resilient arm is carried by the forward end of each channel bar 60, the resilient arm 67 being relatively short and anchored as at 70 to the channel bar 60 with the forward end 71 thereof bent downwardly to overlie the adjacent or forward end of the channel bar. The resilient arms 67 overlie the adjacent base flanges 66 of the hopper and a filler block or bar 72 is positioned between said base flanges 66 and resilient arms 67 so that said arms act to prevent upper displacement of the hopper as a result of vibrations incident to the operation of the molding machine. To maintain the material feed hopper in its correct position with respect to the mold box when charging the latter and to prevent creeping movement of the mold box in directions toward the table structure 62, one form of device for accomplishing these objects is illustrated in Figures 1 to 4 and comprises a latch frame having side arms 73 pivoted intermediate their ends as at 74 to the outer sides of the end walls 65 of the hopper, the upper ends of the arms 73 being connected together by a handle bar 75, while the lower ends of said pivoted arms 73, each carry a latch finger 76 adapted for reception in the keeper opening 77 as shown in Figure 4. The latch lever arms 73 are retained in their operative positions by means of the spring devices 78 connecting said arms below their pivot points 74 to the end walls 65 of the hopper. Upward movement of the lower latch fingers 76 is limited by means of stop pins 79 carried by the end walls of the hopper and arranged in the path of movement of the lower ends of said latch arms 73.

In the use of the machine and in the molding of a block wherein the block is of the type known in the trade as a solid web block, the material hopper is slid from the table into its operative position over the mold box and there can be confined by the resilient arms 68 and the latch lever arms 73. It will of course be understood that the pallet plate with clearance openings therein for the cores, is placed in the mold box and is supported upon the rests or strips 81 bolted at their lower edges as at 82 to the vibrating bars 37, a pallet rest 81 being arranged adjacent each side wall 26 of the mold box and outwardly of the cores therein. With the molding machine in operation, the block material fed to the hopper is delivered into the mold box and vibratory actions of the mold box and cause a quick settling and compacting of the block material into a dense mass. The counter-balances 52 on the counter-balance shaft 51 being arranged at the rearwardly extended ends of the vibrating bars 37 at a considerable distance from the mold box and cores increases vibratory activities of the bars 37, and a consequent increase in vibratory movements imparted to the mold box and cores. The vibrating arms 37 being rigidly connected to the mold box transmit vibratory movements thereto through the rubber block connections between the mold box and the machine frame, while maximum vibrations are imparted to the cores by the direct connection of the cores with said bars 37 and particularly in view of the type of spring connection between the cores and bars 37. The twisted leaf springs 43 form a direct connection between the vibrating bars 37 and the cores substantially midway thereabout the upper and lower ends of the cores so that vibration frequencies of the cores are substantially equal at the upper and lower ends thereof and of course, with this twisted spring connection between the vibrating arms and the cores, the vibrating frequencies of the cores greatly exceed the vibrating frequencies of the mold box, with the vibratory actions described between the mold box and the cores, a more effective rapid settling and compacting of the block material is accomplished. The twisted leaf springs 43 are operative to produce a multi-directional movement of vibration of the cores and to overcome any tendency of the cores to vibrate in one direction which would result in the compacting of the block material in restricted zones and which would so tend to increase wear on the walls of the mold box when the compacting of the mold material is localized.

Upon completion of the molding of a block hereinbefore described as being of the solid web type, the machine is brought to rest and ejecting mechanism for the pallet and the molded block supported thereon is brought into operation. The ejecting mechanism is shown more clearly in Figs. 1, 2, and 6 and comprises a frame structure verticaly slidably associated with the legs or vertical standards of the molding machine, the frame structure, as shown in Figs. 2 and 6 comprising a pair of side bars 83 extended across the machine frame between the standards 20 and connected at their ends by cross bars 84. An outwardly opening channel member 85 is suitably fixed to the cross bars 84 intermediate their ends and the side flanges 86 of the channel members have vertical guidng contact with the vertical standards 20 as illustrated. The lower ends of the channel guide members 85 engage the feet 21 when the ejector frame is in its lower positon for the support of the latter, as illustrated in Figure 2. Each bar 83 of the ejector frame carries an upstanding rod 87 adjacent each end thereof that is suitably secured thereto as at 88, the upper ends of the ejector rods 87 terminating in proximity of the pallet plate 80 and outwardly of the ends of the pallet rests 81 as shown in Figure 3.

The ejecting mechanism further includes means for raising the ejector frame and ejector rods 87 carried thereby and comprises a shaft extending through the end bars 84 between the bars 83 of the ejector frame, the ends of said shaft 89 also extending through the channel guides 85 for receiving on their outer ends rollers 90 with spacer collars 91 on said shaft between the channel guide 85 and said rollers. The shaft 89 is fixed to the cross bars 84 and channel guides 85, the rollers 90 being freely rotatable upon the ends thereof. As shown in Figure 2, a bearing 92 carried by the front side of the forward standard 20 of each pair journals a shaft 93, the opposite ends of which extend beyond the rollers 90, each end of the shaft 93 having an upwardly arched arcuate arm 94 fixed thereto at one end and reinforced by the strap 95 as shown in Figure 7. The free ends of the arcuate arms 94 extend and terminate rearwardly of the standards 20 of the machine frame. Each arcuate arm 94 is provided with a cam abutment 96 that is normally engaged with the adjacent roller 90 when the arcuate arms 94 are at their limits of downward movement. A handle or lever 97 is fixed at its lower end as at 98 to the projecting end 93a of the shaft 93 at one side of the machine frame, said lever being preferably of pipe or tubular formation and weighted by inserts 99, the upper end of the lever 97 terminating at a suitable distance above the upper end of the hopper to increase leverage action thereof on the shaft 93. The hopper is shifted from its operative position overlying the mold box by downward pressure on the handle bar 75 for the operation of the lever arms 73 to disengage the finger 76 of the lever arms from the channel irons and at which time the hopper may be slid laterally of the mold box, stripping the top concrete or other molding material and may be supported on the table structure 62. By the intense compacting of the block material as a result of the vibratory activities of the machine, the block material substantially freezes or adheres to the walls of the mold box and core and unusual pressure has heretofore been required to effect the release of the molded block without injury thereto. By the provision of the cams 96 upon the arcuate arms 94, initial movement of the lever 97 may travel a considerable distance with a minimum movement of the arcuate arms 94 with the cams 96 riding over the rollers 90, this increased leverage afforded by the provision of the cams 96 resulting in easy operation of the ejecting mechanism for the separation of the molded block from the mold box and core. Continued movement of the lever 97 results in more rapid upward movement of the ejector frame with the ejector rods 87 moving the pallet plate 80 with a block supported thereon to a position above the mold box for ready removal of the pallet and block. A guard 100 encloses the arcuate arms 94 while the extended end 93a of the shaft 93 and the lever 97 are located exteriorly of said guard as shown in Figure 6. The inner side of the guard 100 has a slot 101 therein to accommodate upward movement of the shaft 89 carried by the ejector frame, as will be understood from an inspection of Figures 2 and 6.

When it is desired to manufacture, what is known in the trade as half blocks, with single core openings therein, a removable partition is placed in the mold box midway between the two cores, such a partition illustrated in Figures 9 and 10, as comprising a pair of plates 102 contained in spaced relation by means of interposed ribs 103 located in spaced relation to opposite edges of the plates 102 to provide edge grooves 104. A hooked lever 105 to facilitate removal of the partition from the mold box is pivotally mounted as at 106 between the walls 102 and during the molding of the half blocks, the lever 105 occupies the full line position shown in Figure 9, but after the molding of the two half blocks, the lever 105 is shifted upon its pivotal mounting to the dotted line position illustrated, and at which time a suitable implement, such as a rod, may be engaged in the hook 107 to facilitate removal of the partition from the mold box.

To guide the partition into correct position in the mold box and so retain the same, guide means therefor is provided and as shown in Figures 1 to 3 and 11, an arm 108 is positioned outwardly of each side wall 26 of the mold box, the lower end of each arm 108 being forked as at 109 with the fingers of the fork freely received in openings 110 formed in the base flanges 28 of the side walls of the mold. The upper end of each arm 108 carries a blade-like finger 111, directed toward the adjacent side wall of the mold and in registry with a slotted opening 112 in the mold wall. A tensioned thumb nut and screw combination 113 associated with the side wall 26 and arm 108 effects projection of the guide finger 111 through the slotted opening 112 into the interior of the mold box and into a position to be received in the guide slots 104 in the opposite sides of the partition. The forked connection at the lower end of the arms 108 with the base flanges 28 of the side walls of the mold box permit pivotal movements of the arms 108 for the positioning of the guide fingers 111.

In the molding of double-walled or ready furred blocks wherein air spaces are provided between the adjacent ends of webs in addition to the usual core spaces or openings, spacer elements are placed in the mold box and are associated with chosen ones of the guide grooves 41 formed in the outer walls 40 of the cores for the correct positioning of the spacer elements. One type of spacer element as disclosed in the application for patent to Robert B. Shugart, filed Sept. 4, 1941, Serial No. 409,571, may be employed, this type of spacer element being of the soluble type and carrying a tie member that embeds itself in the webs and walls of the block during molding of the block and so remains after the soluble spacer element has been washed away during the curing of the block.

Another type of spacer element and handling mechanism therefor is shown in Figures 12 to 15, the spacer element is of double-channel formation as shown in Figs. 13 and 14, being hinged together at their upper ends as at 115 and adapted to be moved to the opened position illustrated in Figure 13 by means of the enclosed spring 116. The adjacent edges of the channel sections 114 of the spacer element are matingly notched as at 117 to accommodate the placement of a tie member between the walls of the spacer element. The channel spacer elements are manually placed in position in the mold block in seating engagement with chosen grooves 41 in the walls 40 of the cores and the mold material is delivered to the mold box in the usual manner. The channel spacer element may be constructed to occupy the entire length of the grooved portions of the cores, but has been illustrated in Figures 12 to 15, the channel spacer elements are of a length for the molding of four, eight, sixteen blocks. It will be observed from an inspection of Figure 14 that the side walls of the channel spacer elements are inclined or tapered to facilitate easy removal thereof from the molded block. For purposes presently to appear, each channel member of the spacer element is of double channel formation as shown at 114, being hinged together at their upper ends as at 115, and being provided with a slotted opening 118 in the outer wall thereof. In the molding of a block with the channel spacer elements described, means has been provided for the automatic handling of such spacer elements during ejection of the molded block from the mold box and to increase the speed of operation of the machine, such devices comprising a perpendicular guide tube 119 anchored as at 120 to the head of the main frame of the machine, each guide tube 119 carrying a relatively long upwardly extending rod 120 adjustably anchored therein by means of the set screw 121. The upper ends of the rod 120 carry a cross bar 122. A tubular member 123 is slidably mounted upon the upper end of each rod 120 and has a counter balance support for normal movement in an upward direction through the medium of a cord or cable 124 connected at one end as at 125 centrally of the cross bar 126 that is anchored at its ends to the tubular guide 123, the cord or cable 124 traversing the pulleys 127 with the outer free end thereof carrying a counter balancing weight 128. Pairs of downwardly diverging arms 129 depend from the cross bar 126 connecting the tubular guide 123 and each pair of arms is positioned directly above the spacer element in the mold box, the lower end of each arm 129 carrying a projecting finger 130 between the side edges thereof to be received in the slotted openings 118 in the spacer channel element as will be presently described. The channel spacer elements are manually placed in the mold box as described and after the block has been molded and ready for ejection, the cross bar 126 carrying the arms 129 is lowered against the power of the counterbalancing weight 128 to position the lugs 131 carried by the lower ends of the guide tubes 123 into a restrained position relative to the latch arm 132 carried by the tubular member 119, and as illustrated by one of the dotted line positions in Fig. 12. Upon ejection of the molded block from the mold box and with the cross bar 126 and arms 129 carried thereby in their lowermost positions, the block moves upwardly toward the cross bar 126 while the arms 129 are received into the openings in the molded block. Continued ejection of the block causes the same to abut the cross bar 126, that is, the cross bar 126 being of a width less than the distance between the adjacent ends of the block web, the cross bar 126 is directly engaged by the spacer element and moved upwardly to release the lug 131 from the retaining latch arm 132. The dotted line position of the cross bar 126 directly beneath the full line position thereof in Figure 12 shows the side slotted openings 118 in the channel spacer element as being in alignment with the fingers 130 carried by the arms 129 so that upon continued upward movement of the ejected block the lower ends of the channel spacer elements move away from the walls of the mold box and the cross therein and at which time the spring members 116 cause pivotal movement of the channel spacer elements on their hinged connections 115 with the pins 130 received in the slotted openings 118 for the retention and suspension of the spacer elements. The counterbalancing weight 128 continues to move the cross bar 126 to a further elevated position and for the displacement of the spacer elements relative to the molded block to facilitate removal of the molded block with its pallet from the machine. To prevent pivotal movement of the channel spacer elements when supported by the arms 129 and also to restrain the spacer elements from such pivotal movement substantially at the time of leaving the molded block and to prevent injury to the latter, pairs of guide fingers 133 depend from the cross bar 126 between the pairs of arms 129 to be positioned at opposite sides or at the ends of the hinged portions of the channel spacer elements, as will be clearly understood from an inspection of Figures 12 and 13.

Another form of mounting for the mold box and cores is illustrated in Figure 16 and shows, the mold box designated in general by the reference character 26a having the base flanges 28a thereof rigidly connected to the head bars 22a of the machine frame with a rigid filler member 133 interposed between the mold box flange and head rail. Each vibrating bar 37a has a double rubber block connection 32a with the base flange 28a of the mold box 26a, while the core 40a that is open at its lower end carries a cross bar 134 extending across said lower open end that is directly bolted or otherwise anchored to the vibrating bar 37a. It will be understood that vibratory movements are imparted to the mold box through the medium of the rubber block connection between the mold box and the vibrating arm while maximum vibrations are imparted to the core by its direct connection with the vibrating arm.

As shown in Figure 16A, the mold box designated in general by the reference character 26b has base flanges 28b that have double rubber block connections 32b with the vibrating bar 37b, it also being understood that the mold box 26b is rigidly supported upon the head rails of the machine frame. Also, in this form of the invention, a twisted leaf spring 43b, similar to the spring shown in Figure 3, forms a direct connection between the vibrating bar 37b and the core 40b.

It is also intended that the hopper mounting illustrated in Figure 17 be substituted for the hopper mounting shown in Figure 2 with its anticreeping attachment and hold-down spring arm and in said Figure 17, together with Figures 18 and 19, the hopper 65a carries a base flange 66a riding upon the top flanges 27a of the mold box. A guard housing of substantially inverted U-formation has the outer side wall 135 thereof welded or otherwise secured as at 136 to the mold box flange 27a, with the inner wall of said guard shortened and overlying said flange. The top wall 137 of said U-shaped guard has a track rail 138 secured thereto and depending therefrom as clearly shown in Fig. 18. A leaf spring 139 has one end thereof anchored as at 140 to the base flange 66a of the hopper, the other end of the leaf spring riding freely upon said flange, the leaf spring being upwardly arched and carrying intermediate its ends a journalled roller or sheave 141 which, when the mold box is in its operative position overlying the mold box, is received in the notch 138a in the lower edge of the track rail 138 as shown in Figure 19, this engagement of the parts preventing creeping movement of the hopper during operation of the molding machine. The spring 139 being interposed between the guard housing that is rigid with the mold box and the hopper is operative for restraining upward vibratory movement of the hopper.

Referring again to the spring bolt and thumb nut combination for the operation of the arms to project the guide fingers 111 into the mold box, as shown in Figure 2, another arrangement of devices for controlling the position of the guide finger 111, as shown in Figure 10a in which the mold box wall 26c has one end of the screw 113c fixed thereto as at 141, the screw 113c extending through an opening in the arm 108c and carrying upon its outer end a thumb nut 142 with a coil spring 143 interposed between the nut and arm for normally influencing the arm in a direction toward the wall 26c of the mold box. To limit movement of the upper end of the arm 108c carrying the guide finger 111c, there is provided a screw 144 that threads through an opening in the arm 108c above the screw 113c with the forward end of the screw 144 abutting the side wall 26c of the mold box. The outer free end of the screw 144 has a single laterally directed wing or finger grip 145 for the operation of the screw which by the placement of the weight of the finger grip 145 at one side of the screw 144, rotation of the screw during vibratory actions of the machine is prevented.

In the event of seepage of the block material through small spaces or crevices between the cores, side walls of the mold box and the pallet, there is provided a drip pan 146 arranged at an inclination as shown in Figure 2 that extends from the inclined brace bar 25 forwardly and downwardly between the pairs of standards of the machine frame and in overlying relation to the ejector operating shaft 93. This drip pan directs the waste materials to a definite point for ready collection.

From the above detailed description of the invention, it is believed that the construction and operation thereof will at once be apparent and while there are herein shown and described the preferred embodiments of the invention, it is nevertheless to be understood that minor changes may be made therein without departing from the spirit and scope of the invention as claimed.

We claim:

1. In a block molding machine of the character described, a machine frame, a mold box supported on the machine frame, cores in the mold box, a pair of vibrating bars for the support of the cores and means for vibrating the bars in unison including an unbalanced shaft carried by said bars and located at a point spaced laterally of the mold box for increasing vibratory action of the bars, a connection between the vibrating bars and the mold box, and a twisted flat spring connection between the vibrating bars and core intermediate the upper and lower ends of the cores to impart a multi-directional vibratory motion of the cores of the amplitudes at the upper and lower ends of the cores.

2. In a block molding machine of the character described, a machine frame, a mold box supported on the machine frame, cores in the mold box, a pair of vibrating bars constituting the sole support for the cores and means for vibrating the bars in unison including an unbalanced shaft carried by said bars and located at a point spaced laterally of the mold box for increasing vibratory action of the bars, a connection between the vibrating bars and the mold box, and a twisted flat spring connection between the vibrating bars and core intermediate the upper and lower ends of the cores to impart a multi-directional vibratory motion to the cores of the amplitudes at the upper and lower ends of the cores.

3. In a block molding machine of the character described, a machine frame, a mold box supported on the machine frame, cores in the mold box, a pair of vibrating bars for the support of the cores and means for vibrating the bars in unison including an unbalanced shaft carried by said bars and located at a point spaced laterally of the mold box for increasing vibratory action of the bars, a connection between the vibrating bars and the mold box, and a twisted flat spring connection between the vibrating bars and core intermediate the upper and lower ends of the cores to impart a multi-directional vibratory motion to the cores of like amplitudes at the upper and lower ends of the cores, the support of the mold box on the machine frame including rubber block mountings.

4. In a block molding machine of the character described, a machine frame, a mold box supported on the machine frame, cores in the mold box, a pair of vibrating bars constituting the sole support for the cores and means for vibrating the bars in unison including an unbalanced shaft carried by said bars and located at a point spaced laterally of the mold box for increasing vibratory action of the bars, a connection between the vibrating bars and the mold box, and a twisted flat spring connection between the vibrating bars and core intermediate the upper and lower ends of the cores to impart a multi-directional vibratory motion to the cores of like amplitudes at the upper and lower ends of the cores, the support of the mold box on the machine frame including rubber block mountings.

5. In a block molding machine of the character described, a machine frame, a mold box supported on the machine frame, cores in the mold box, a pair of vibrating bars for the support of the cores and means for vibrating the bars in unison including an unbalanced shaft carried by said bars and located at a point spaced laterally of the mold box for increasing vibratory action of the bars, a rubber block connection between the vibrating bars and the mold box, and a twisted flat spring connection between the vibrating bars and core intermediate the upper and lower ends of the cores to impart a multi-directional vibratory motion to the cores of like amplitudes at the upper and lower ends of the cores.

6. In a block molding machine of the character described, a machine frame, a mold box supported on the machine frame, cores in the mold box, a pair of vibrating bars constituting the sole support for the cores and means for vibrating the bars in unison including an unbalanced shaft carried by said bars and located at a point spaced laterally of the mold box for increasing vibratory action of the bars, a rubber block connection between the vibrating bars and the mold box, and a twisted flat spring connection between the vibrating bars and core intermediate the upper and lower ends of the cores to impart a multi-directional vibratory motion to the cores of like amplitudes at the upper and lower ends of the cores.

7. In a block molding machine of the character described, a machine frame, a mold box supported on the machine frame, cores in the mold box, a pair of vibrating bars for the support of the cores and means for vibrating the bars in unison including an unbalanced shaft journaled on said bars and located at a point spaced laterally of the mold box for increasing vibratory action of the bars, the support for the mold box on the machine frame including base flanges on the mold box with openings therein, pairs of cooperating rubber blocks above and below the flanges and contacting each other through said openings with the lower rubber blocks supported on the machine frame, anchor bolts extending through the rubber blocks and frame, and said core being rigidly connected to the vibrating bars.

8. In a block molding machine of the character described, a machine frame, a mold box supported on the machine frame, cores in the mold box, a pair of vibrating bars constituting the sole support for the cores and means for vibrating the bars in unison including an unbalanced shaft journaled on said bars and located at a point spaced laterally of the mold box for increasing vibratory action of the bars, the support for the mold box on the machine frame including base flanges on the mold box with openings therein, pairs of cooperating rubber blocks above and below the flanges and contacting each other through said openings with the lower rubber blocks supported on the machine frame, anchor bolts extending through the rubber blocks and frame, and said core being rigidly connected to the vibrating bars.

9. In a block molding machine of the character described, a machine frame, a mold box supported on the machine frame, cores in the mold box, a pair of vibrating bars for the support of the cores and means for vibrating the bars in unison including an unbalanced shaft carried by said bars and located at a point spaced laterally of the mold box for increasing vibratory action of the bars, a partition removably mounted in the mold box for molding half blocks, said partitions having diametrically opposite guide grooves and manually operable guide fingers adapted to be projected into the mold box through opposite walls to be received in the partition grooves and constituting guides for the partition.

10. In a block molding machine of the character described, a machine frame, a mold box supported on the machine frame, cores in the mold box, a pair of vibrating bars constituting the sole support for the cores and means for vibrating the bars in unison including an unbalanced shaft carried by said bars and located at a point spaced laterally of the mold box for increasing vibratory action of the bars, a partition removably mounted in the mold box for molding half blocks, said partitions having diametrically opposite guide grooves and manually operable guide fingers adapted to be projecting into the mold box through opposite walls to be received in the partition grooves and constituting guides for the partition.

11. In a block molding machine of the character described, a machine frame, a mold box supported on the machine frame, cores in the mold box, a pair of vibrating bars constituting the sole support for the cores and means for vibrating the bars in unison including an unbalanced shaft carried by said bars and located at a point spaced laterally of the mold box for increasing vibratory action of the bars, said cores having longitudinally extending grooves in their outer faces and spacer elements used in the molding of double-walled blocks adapted to be guidingly placed in the mold box by reception in said grooves, said spacer elements comprising sections hinged together at their upper ends, a spring for normally separating the sections at their hinge connection, each section having an opening therein and counter-balanced receiver devices for the spacer elements having fingers projected into the spacer element openings when the spacer elements and blocks are ejected from the mold box.

12. In a block molding machine of the character described, a machine frame, a mold box supported on the machine frame, cores in the mold box, a pair of vibrating bars for the support of the cores and means for vibrating the bars in unison including an unbalanced shaft carried by said bars and located at a point spaced laterally of the mold box for increasing vibratory action of the bars, a partition removably mounted in the mold box for molding half blocks, said partitions having diametrically opposite guide grooves and manually operable guide fingers adapted to be projected into the mold box through opposite walls to be received in the partition grooves and constituting guides for the partition, said partition being of spaced wall formation, a pivoted arm having a hook at one end and normally confined between the spaced walls, said arm adapted to be moved on its pivot after the molding of half blocks to expose the hook for engagement by an implement to facilitate removal of the partitions.

JUSTICE G. BOETTCHER.
ROBERT B. SHUGART.